(12) United States Patent  
Tahara et al.

(10) Patent No.: US 6,546,822 B1  
(45) Date of Patent: Apr. 15, 2003

(54) SEAT OCCUPANT SENSOR DEVICE

(75) Inventors: Takeshi Tahara, Chiryu (JP); Yasuaki Suzuki, Kariya (JP); Koji Ito, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/708,579

(22) Filed: Nov. 9, 2000

(30) Foreign Application Priority Data

Nov. 9, 1999 (JP) .......................................... 11-317780

(51) Int. Cl.$^7$ ................................................. G01L 5/10
(52) U.S. Cl. .................................................... 73/866.41
(58) Field of Search ........................ 73/862.41, 862.42, 73/862.43, 862.46, 862.451, 862.391, 819

(56) References Cited

U.S. PATENT DOCUMENTS 5,896,090 A      4/1999  Okada et al.
5,996,421 A  *  12/1999  Husby ................... 73/862.451
6,244,116 B1 *   6/2001  Osmer et al. .......... 73/862.474

* cited by examiner

Primary Examiner—Hezron Williams
Assistant Examiner—C Dickens
(74) Attorney, Agent, or Firm—Burns, Doane, Swecker & Mathis, LLP

(57) ABSTRACT

A seat occupant sensor device for detecting whether or not an occupant is seated on a seat is made up of a pressure sensitive switch including a pair of sensor portions and a connecting portion, with each of the sensor portions being formed as an integration of a pair of opposed films and a spacer. On one of the films is disposed a plurality of spaced first electrodes which are electrically connected to each other by way of a first conductive path, and on the other film is disposed a plurality of spaced second electrodes which are electrically connected to each other by way of a second conductive path. The spacer is disposed between the pair of opposed films in such a manner that each of the first electrodes is maintained separate from the corresponding second electrode when the seat is unoccupied. The first conductive path and the second conductive path extend into the connecting portion, and the connecting portion is positioned, when in its free state, between the pair of the sensor portions. A connector is provided at the distal end of the connecting portion for connecting the first conductive path and the second conductive path to an external control device. A block member is provided at a connecting region at which a proximate end of the connecting portion is connected to each of the sensor portions for guiding the connecting portion reversely.

24 Claims, 10 Drawing Sheets

SEAT OCCUPANT SENSOR DEVICE

This application is based on and claims priority under 35 U.S.C. §119 with respect to Japanese Application No. 11(1999)-317780 filed on Nov. 9, 1999, the entire content of which is incorporated herein by reference.

FIELD OF THE INVENTION

The present invention is generally directed to a sensor device. More particularly, the present invention pertains to a seat occupant sensor device for detecting a seated person on a vehicular seat.

BACKGROUND OF THE INVENTION

Seat occupant sensor devices which detect a seated person on a vehicular seat and make it possible to instruct or remind the person to put on their seat belt are known. The pressure sensitive switches used as an essential component of the seat occupant sensor devices are generally divided into several types, including a linear type using piezoelectric film, a film-using ON-OFF type, a limit switch using type, a magnet type using a strain gauge for detecting magnetic change.

The present invention is directed to a seat occupant sensor device that includes a pressure sensitive switch of film-using on-off type. The basic concept of the seat occupant sensor device of the type is disclosed in U.S. Pat. No. 5,896,090 granted to Okada et al.

The aforementioned basic concept has been employed to provide a seat occupant sensor device of the film-using type which is in the form of a pressure sensitive sensor device. This device includes, as shown in FIG. 11, a pair of bifurcated sensor portions 10 and a connecting portion 9 which terminates in a connector 11 to be electrically coupled to a vehicular harness. The sensor portions 10 are placed below the outer surface layer of the seat cushion and the connecting portion 9 extends from the rear portion of the seat cushion into the bottom portion of the seat cushion.

As can be seen from FIGS. 12 and 13, the structure of the sensor portion 10 and the connecting portion 9 includes a pair of opposed films 2 and 3 between which is positioned a spacer 1. The spacer 1 includes a plurality of openings 7 connected by a passage 6. A plurality of spaced circular electrodes 5 are provided on the inner surface of the film 2. The spaced circular electrodes 5 are formed along a single or common printed conductive path 4 of carbon or copper powder. The inner surface of the other film 3 is similarly provided with a plurality of spaced circular electrodes 5 formed along a single or common printed conductive path 4 of carbon or copper powder in the form of a carbon-printed strip or a copper-printed strip. Each of the electrodes 5 on the film 2 and the corresponding circular electrodes 5 positioned in opposing relation on the film 3 constitute a plurality of parallel arranged switches between the conductive paths 4, 4.

As best shown in FIG. 13, the conductive path 4 printed on the film 2 and the conductive path 4 printed on the film 3 are arranged in a horizontally symmetrical fashion with respect to the vertically extending air passage 6 which is formed in the spacer 1. One of the openings 7 in the spacer 1 is positioned between each of the circular electrodes 5 on the film 2 and the corresponding opposed circular electrode 5 on the film 3. When the seat is occupied by an individual, an electric connection or contact is established between the opposed circular electrodes 5, 5. Electric current thus flows through the conductive paths 4, 4, resulting in a detection of a person seated on the seat cushion.

Referring back to FIG. 11, the integrated structure of the films 2, 3 between which the foregoing arrangements are provided possesses a substantially Y-shaped configuration, in plan view, which includes the connecting portion 9 whose distal end is connected with a connector 11 and the pair of the sensor portions 10, 10 extending from the proximate end of the connecting portion 9. The connector 11 is connected to the conductive paths.

In addition, due to the fact that the integral structure of the sensor portions 10, 10 and the connecting portion 9 can be made when connecting the opposed films 2, 3 which are identical in shape through use of a bonding agent 8, as can be understood from the illustration in FIG. 13, each of the films 2, 3 can be obtained by punching a resin-made sheet provided with the plurality of printed circular electrodes 5 and the conductive path 4 into a predetermined shape. Such a formation process is technically advantageous in addition to the above-described configuration in which the sensor portions 10 together with the conductive path 4 extend from the connection portion 9 in a bifurcated fashion depending on the shape or dimension of seat cushion.

However, in the known sensor device described above, the yield rate in producing the films from a sheet of resin material is not very high.

Thus, a need exists to provide a seat occupant sensor device in which the film is formed into a shape which increases its yield rate when punched from a resin-made sheet and which is capable of being equipped in various types of vehicular seats, while at the same time maintaining the advantages mentioned above.

SUMMARY OF THE INVENTION

Generally speaking, the present invention provides a seat occupant sensor device in which a sheet of resin material on which a plurality of electrodes and a conductive path are printed is punched to form a film used in forming a pressure sensitive switch that includes a connecting portion positioned between a pair of sensor portions. When used, the connecting portion is brought into reversely bent position in which the connecting portion is bent rearwardly relative to the sensor portions through an angle of about 180 degrees.

One aspect of the present invention involves a seat occupant sensor device that includes a pressure sensitive switch having a pair of sensor portions and a connecting portion, each of the sensor portions being formed as an integration of a pair of opposed films and a spacer, with one of the films having disposed thereon a plurality of spaced first electrodes which are electrically connected to each other by way of a first conductive path and the other film having disposed thereon a plurality of spaced second electrodes which are electrically connected to each other by way of a second conductive path. The spacer is disposed between the pair of opposed films in such a manner that each of the first electrodes is maintained separate from the corresponding second electrode when the seat is unoccupied. The first conductive path and the second conductive path extend into the connecting portion, and the connecting portion is positioned, when in its free state, between the pair of sensor portions. A connector is provided at a distal end of the connecting portion for connecting the first conductive path and the second conductive path to an external control device. A block member is provided at a connecting region at which the proximate end of the connecting portion is connected to each of the sensor portions. The block member guides the connecting portion reversely.

According to another aspect of the invention, a seat occupant sensor device for detecting whether or not an occupant is seated on a seat includes a pressure sensitive switch comprised of a pair of films and a spacer positioned between the films, with one of the films being provided with a first electrode connected to a first conductive path and the other film being provided with a second electrode connected to a second conductive path. The spacer is disposed between the pair of films in such a manner that the first electrode is separate from the second electrode when the seat is unoccupied. The pressure switch possesses a configuration defining spaced part sensor portions and a connecting portion, with the first conductive path and the second conductive path extending into the connecting portion of the pressure sensitive switch, and with the sensor portions being connected to the connecting portion at a connecting region. A connector is connected to the connecting portion for connecting the first conductive path and the second conductive path to an external control device. A block member is positioned at the connecting region of the pressure sensitive switch with at least a part of the connecting portion extending along the block member in a direction generally opposite the sensor portions.

Another aspect of the invention involves a seat occupant sensor device that includes a pressure sensitive switch comprised of a pair of sensor portions, a connecting portion and a connecting region at which the connecting portion is integrated with the sensor portions. Each of the sensor portions is provided with at least one first electrode and at least one second electrode that are separated from one another when the seat is unoccupied and that contact one another when the seat is occupied. The first electrode of at least one sensor portion is connected to a first conductive path and the second electrode of at least one sensor portion is connected to a second conductive path, with the first and second conductive paths extending into the connecting portion. A connector is connected to the first conductive path and the second conductive path to connect the first and second conductive paths to an external control device. The connecting portion is bent back upon the connecting region and extends in a direction generally opposite the direction of extent of the sensor portions.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
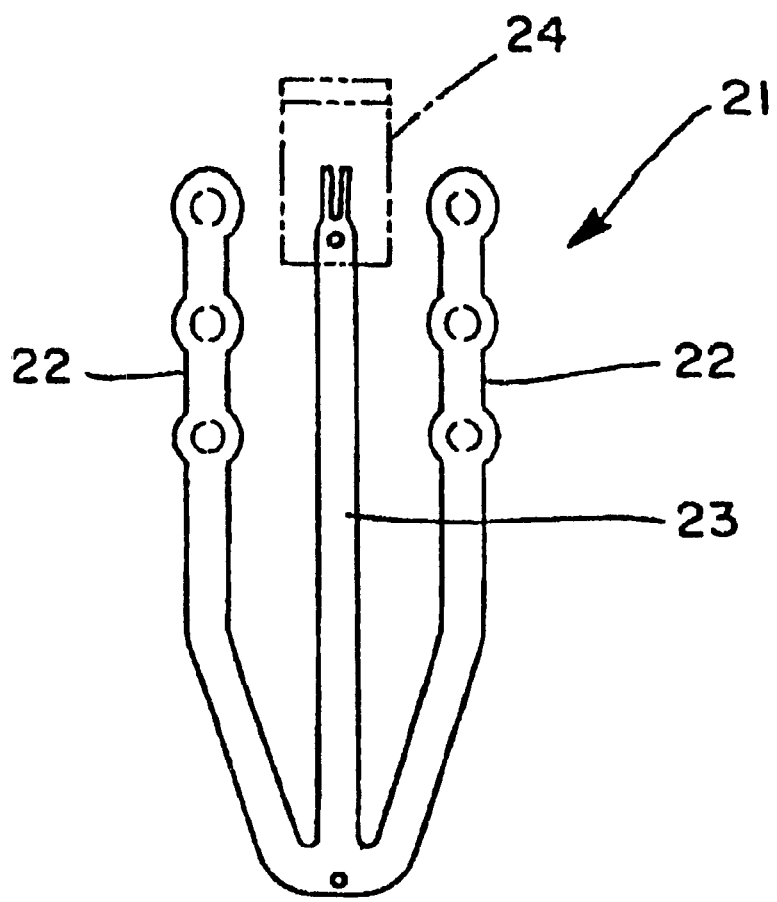
FIG. 1 is a plan view of a seat occupant sensor device according to the present invention.

Referring initially to FIG. 1, a seat occupant sensor device 21 in accordance with the present invention includes a pair of sensor portions 22, 22, a connecting portion 23 and a connector 24. The connecting portion 23 extends between the pair of sensor portions 22, 22 and is electrically connected to the pair of sensor portions 22, 22. The connector 24 is coupled to the distal end of the connecting portion 23 and is connected to a vehicular side harness (not shown). The connector 24 can be a well-known or commercially available type of connector.

The sensor portions 22 and the connecting portion 23 constitute a pressure sensitive switch which is similar to the known pressure sensitive switch described above with respect to its general layered construction and production method. That is, similar to the illustrated procedures shown in FIGS. 12 and 13, a plurality of electrodes and a conducting path are printed or otherwise formed on the surface of each of a pair of films, a spacer is interposed between the resulting films, and a bonding agent is provided between two adjacent members to constitute or form the integrated configuration of the pressure sensitive switch. Considering that the fabrication method and general resulting configuration associated with the present invention is similar to that described earlier, a detailed description will not be repeated here.

Figure 2:
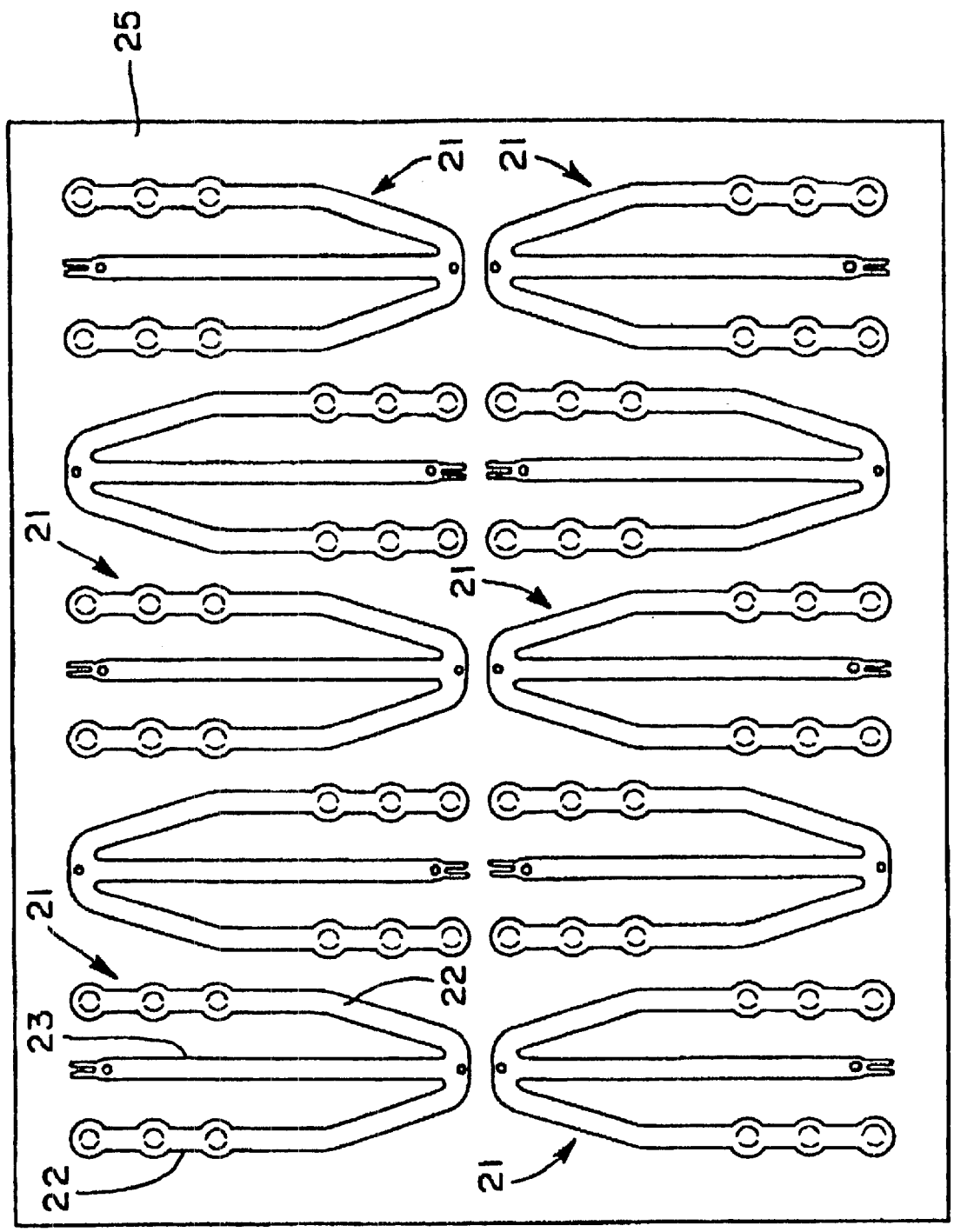
FIG. 2 is a plan view of an arrangement of a plurality of films which are in the form of a resin-made sheet.
Figure 14:
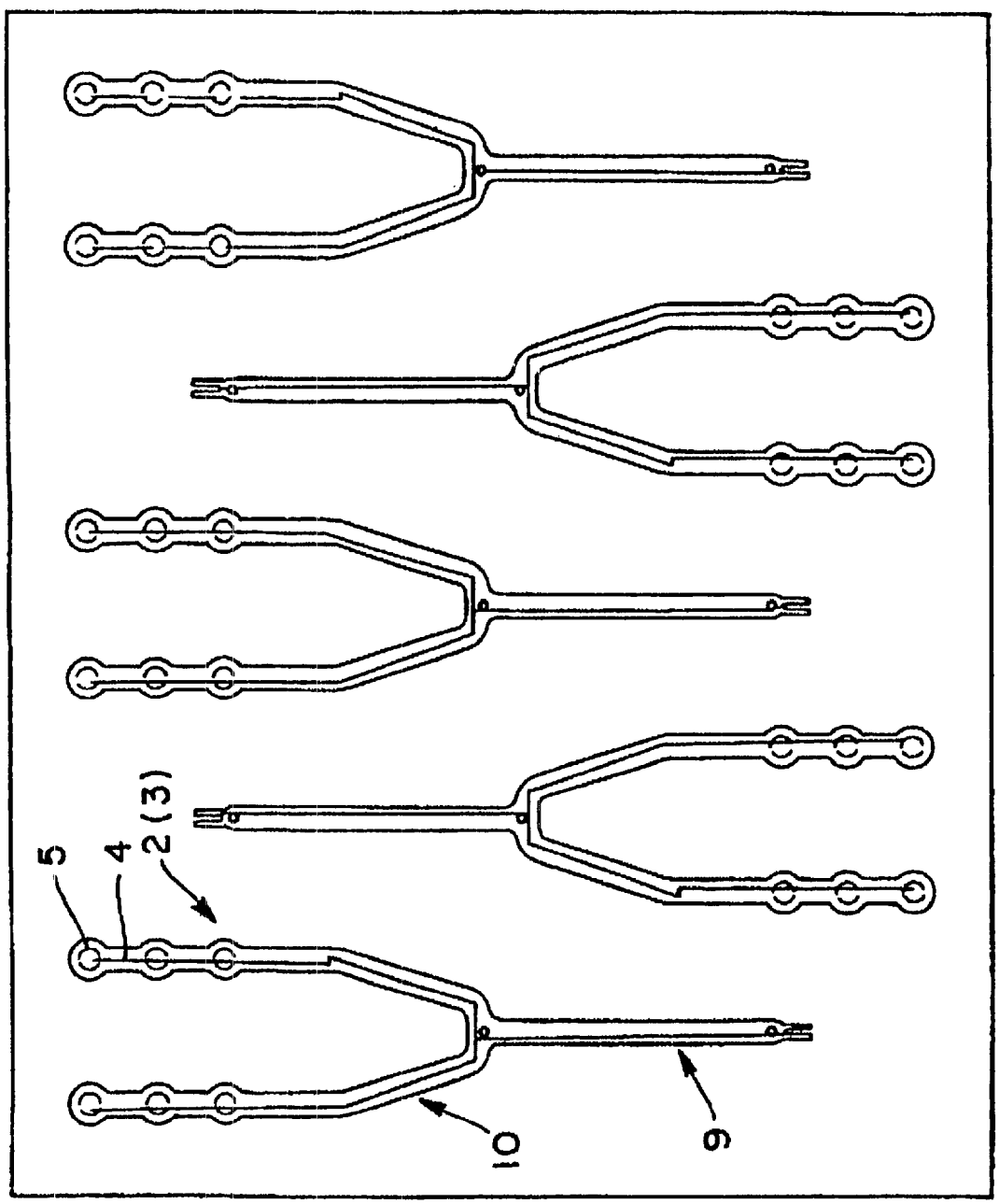
FIG. 14 illustrates an arrangement of a plurality of known films.

A plan profile of the integrated sensor portions 22, 22 and connecting portion 23 of the seat occupant sensor device 21 is printed, as illustrated in FIG. 2, on the surface of a resin-made sheet 25, and the resin-made sheet 25 is then punched out along the outer profile of the integration. The arrangement according to the present invention in which the connecting portion 23 extends between the sensor portions 22, 22 improves remarkably the yield rate of the number of films produced from the resin-made sheet 25 when compared to the conventional arrangement illustrated in FIG. 14.

Figure 3:
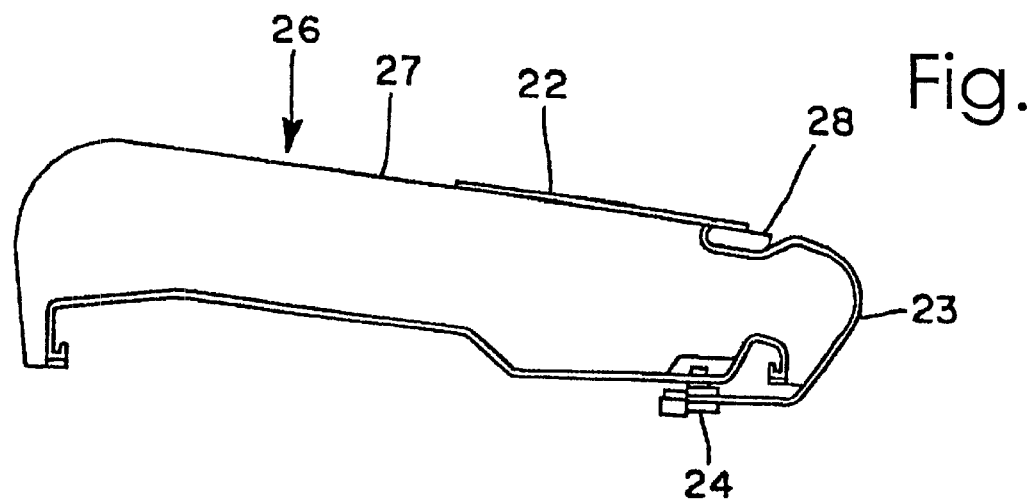
FIG. 3 is a side view of a seat cushion with which the seat occupant sensor device illustrated in FIG. 1 is to be used.

FIG. 3 illustrates an example of how the seat occupant sensor device 21 is mounted with respect to a vehicular seat. The sensor portions 22, 22 are provided on the outer surface 27 of a seat cushion 26 in an extending fashion as illustrated. The connecting portion 23 is turned through an angle of about 180 degrees so that the sensor portions 22, 22 extend in the forward direction while the connecting portion 23 extends in the rearward direction. The connecting portion 23 is reversely guided by a block member 28 so that the connecting portion 23 extends in the rearward direction of the seat cushion 26 and in turn terminates in a lower space or lower region of the seat cushion 26. The connector 24 is oriented in the vehicular frontward direction so as to be capable of being coupled with a controller 90 by way of a vehicular side harness 92 in a known manner.

It is to be noted that the seat cushion 26 is covered with a cover member (not shown) after completion of the mounting of the seat occupant sensing device.

Figure 4:
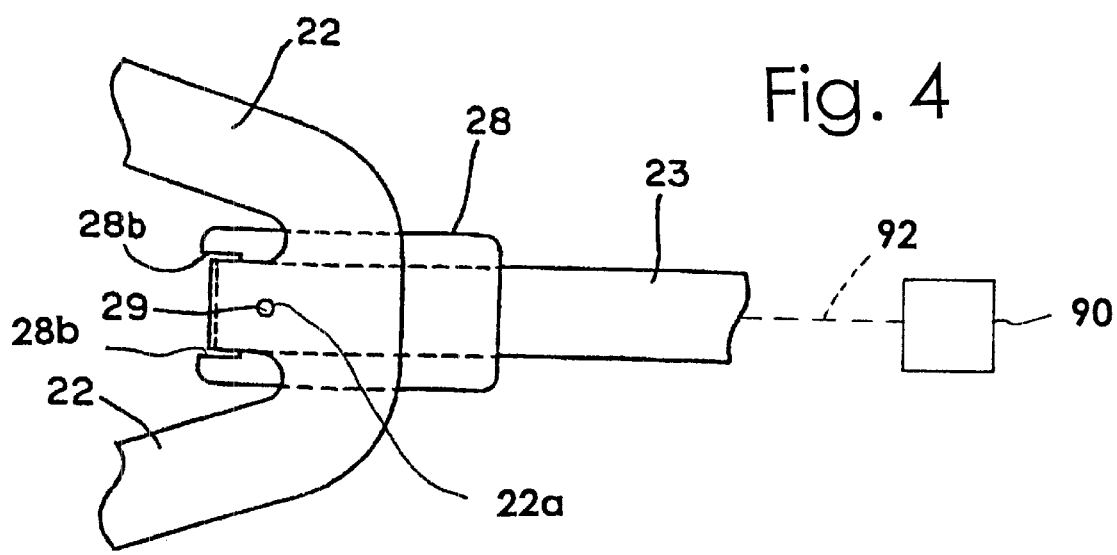
FIG. 4 is a plan view of an example of a block used in the seat cushion shown in FIG. 3.
Figure 5:
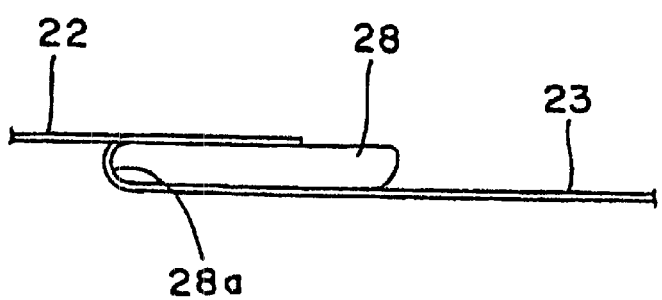
FIG. 5 is a side view of the block illustrated in FIG. 4.

The following is an explanation of the block member 28 which guides the connecting portion 23 in the reverse direction or rearward or backward direction. As shown in FIGS. 4 and 5, the block member 28, which is preferably formed of synthetic resin, is in the form of a thin-walled rectangular prism whose width (i.e., the lateral dimension as seen with reference to FIG. 4) is slightly larger than that of the connecting portion 23. A connecting region of the sensor device at which each of the sensor portions 22, 22 meets with the connecting portion 23 is secured to the central upper surface of the block member 28 in an appropriate manner, for example with a bonding agent. The part of the connecting portion 23 extending from such a secured part of the connecting region and extending along the front curvature end 28a and the rear side of the block member 28 is also secured to the block member in an appropriate manner such as with a bonding agent. Thus, the connecting portion 23 is fixed to the block member 28. A pair of opposed guide walls 28b, 28b are formed at the opposite sides of the front curvature end 28a of the block member 28 for preventing an offset of the connecting portion 23 from the front curvature end 28a. That is, the guide walls 28b, 28b guide the connecting portion 23 so that it is positioned in the desired manner.

The connecting region of the sensor device at which the sensor portions 22, 22 meet with the connecting portion 23 is provided with a hole 22a, and the block member 28 is provided thereon with an integral projection 29. This projection 29 engages the hole 22a in the connecting region in a male-and-female fitting engagement for positioning the sensor portions 22, 22 relative to the block member 28.

Figure 6:
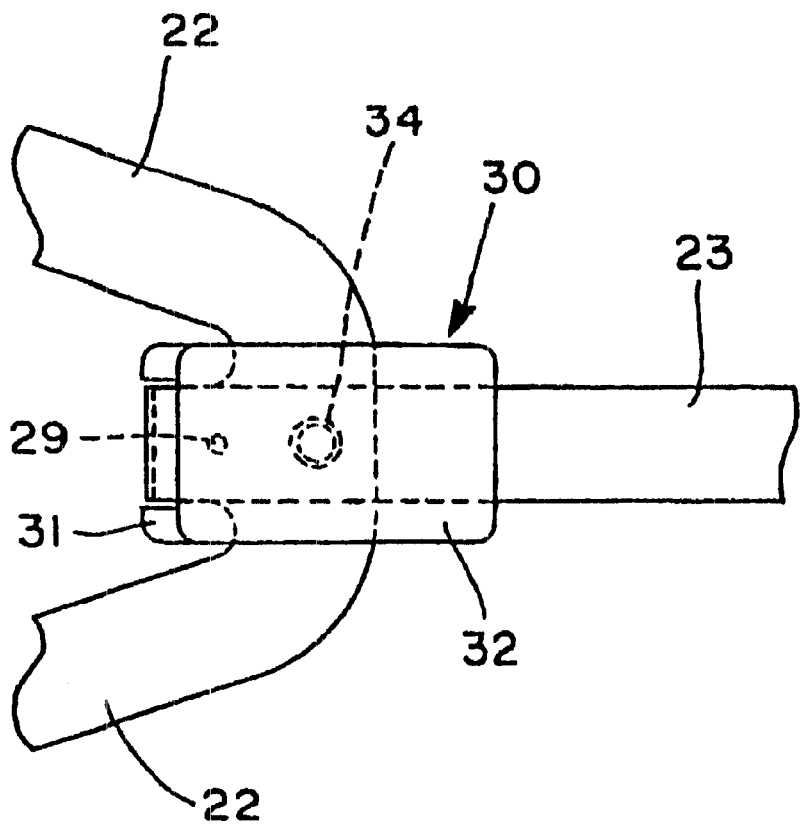
FIG. 6 is a plan view of a different version of the block.
Figure 7:
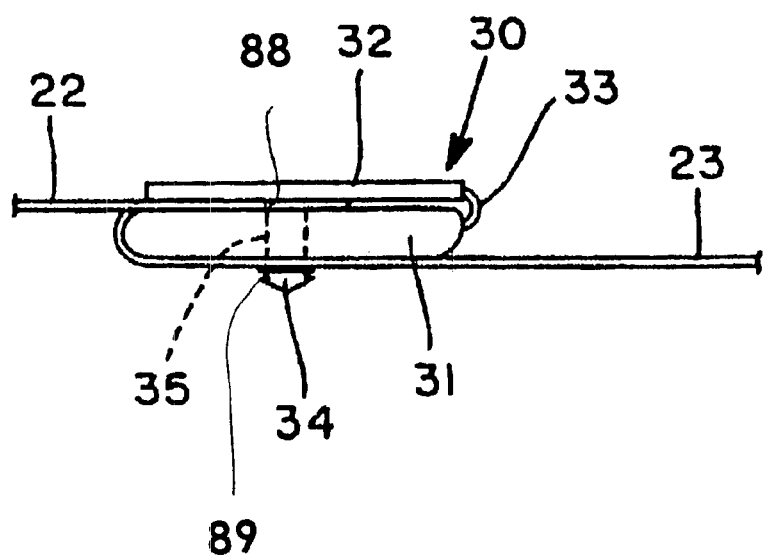
FIG. 7 is a side view of the block illustrated in FIG. 6.

FIGS. 6 and 7 illustrate a slightly different version of the block member 28. The block member 30 includes a main body 31 in the form of a rectangular prism, a cover member 32 which covers an upside or topside surface of the main body 31, and a bridge member 33 connecting the main body 31 and the cover member 32. A pin element 34 formed on the cover member 32 and a hole 35 is formed in the main body 31 for receiving the pin portion 34.

Figure 12:
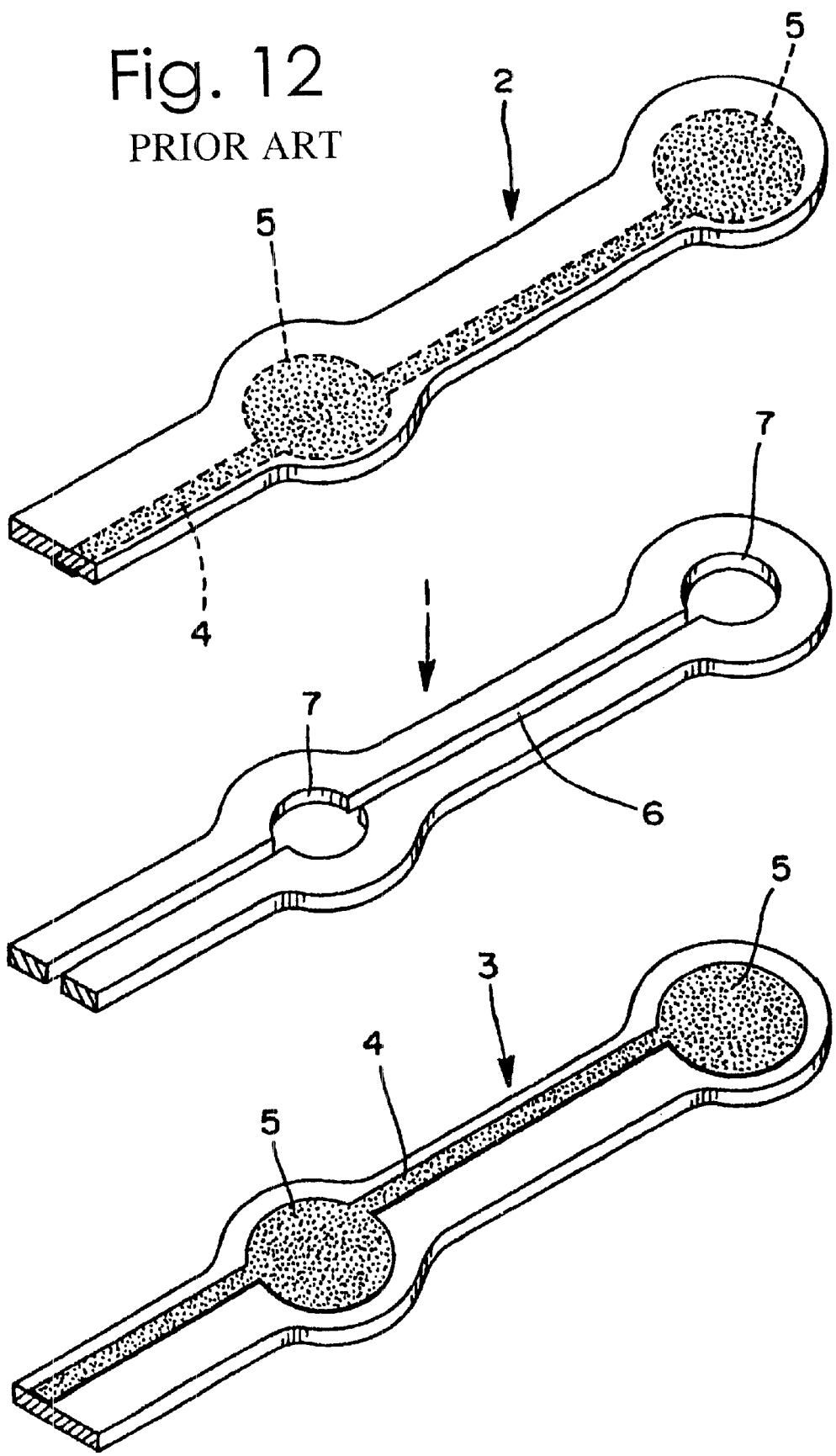
FIG. 12 is a perspective view of the parts forming the sensor shown in FIG. 11 including the spacer and set of films.
Figure 13:
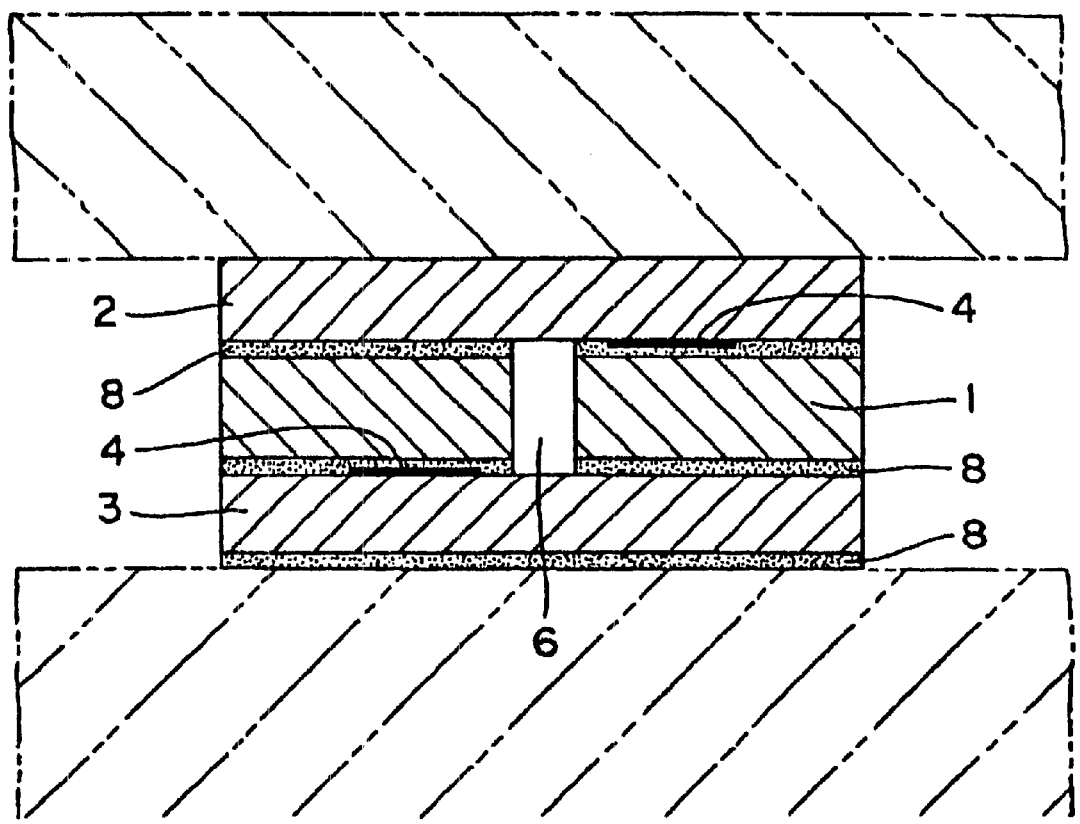
FIG. 13 is a cross-sectional view of the seat occupant sensor device illustrated in FIG. 11.

When this block member 30 is employed instead of the block member 28, holes 88, 89 are provided in the connecting region at which the connecting portion 23 meets each of the sensor portions 22, 22 and the connecting portion 23, respectively, so as not interfere with the conductive path (i.e., the conductive path 4 such as shown in FIG. 12).

Initially, the connecting region is placed on the upside or topside surface of the main body 31 of the block member so that the hole 88 of the connecting region is brought into coincidence or is aligned with the hole 35 in the main body 31. Then, the cover member 32 is moved onto the connecting region so that the pin portion 34 passes through the aligned holes 88, 35. This results in the connecting region being held between the main body 31 and the cover member 32. After this fixation, the connecting portion 23 is bent rearwardly in such a manner that the connecting portion 23 is held by an arrow headed distal end of the pin portion 34 which passes through the hole 89 in a snap engaging fashion.

Figure 8:
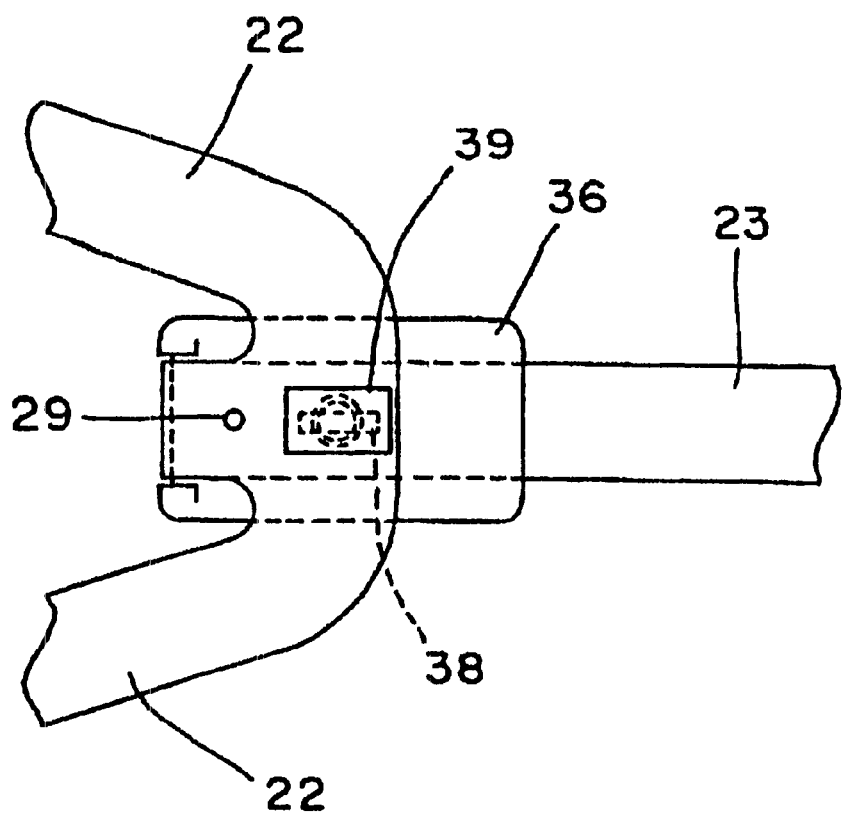
FIG. 8 is a plan view of a further embodiment of the block.
Figure 9:
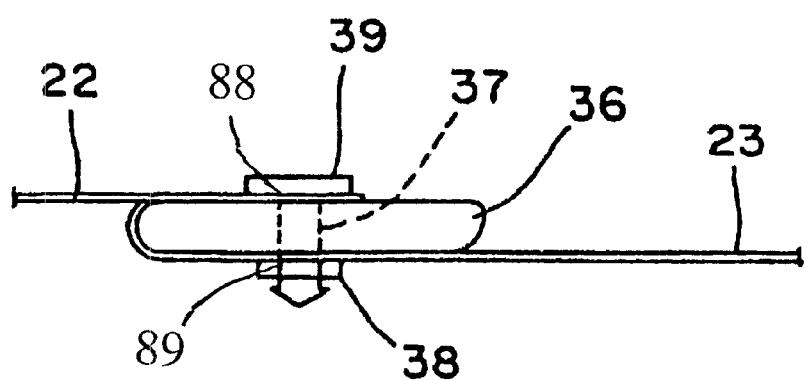
FIG. 9 is a side view of the block illustrated in FIG. 8.

FIGS. 8 and 9 illustrate an alternative block member 36 according to a further aspect of the present invention. The block member 36 includes a main body formed of resin that is provided with a hole 37 (e.g., a rivet hole). Similar to the construction described above and illustrated in FIGS. 6 and 7, holes 88, 89 are provided in the connecting region at which the connecting portion 23 meets each of the sensor portions 22, 22 and the connecting portion 23, respectively, so as not interfere with the conductive path.

With this embodiment of the block member 36, the connecting region of the sensor device is placed on the upside or topside surface of the main body of the block member 36 so that the hole 88 of the connecting region is brought into coincidence or alignment with the hole 35 of the main body 36. After the connecting portion 23 is rearwardly or reversely extended, a connecting element 39, for example a rivet, is fitted in the holes 88, 37, 89 so that the connecting region is held between main body of the block member 36 and the head of the connecting element or rivet 39. The connecting portion 23 which is reversely or rearwardly extended is held between a lower surface of the main body of the block member 36 and a shim 38 by the distal end of the pin portion of the rivet 39 in snap engagement fashion.

In each of the versions of the pressure sensitive switch described above, the connecting portion 23 is bent back upon the connecting region at which the connecting portion 23 meets each of the sensor portions 22, 22 and the connecting portion 23. In addition, in each of the versions of the pressure sensitive switch described above, the connecting portion 23 extends from an edge of the connecting region that faces in the same direction as the sensor portions 22, 22, with the connecting portion 23 being rearwardly bent so that the connecting portion 23 extends out of the plane of the sensor portions 22, 22.

Figure 10:
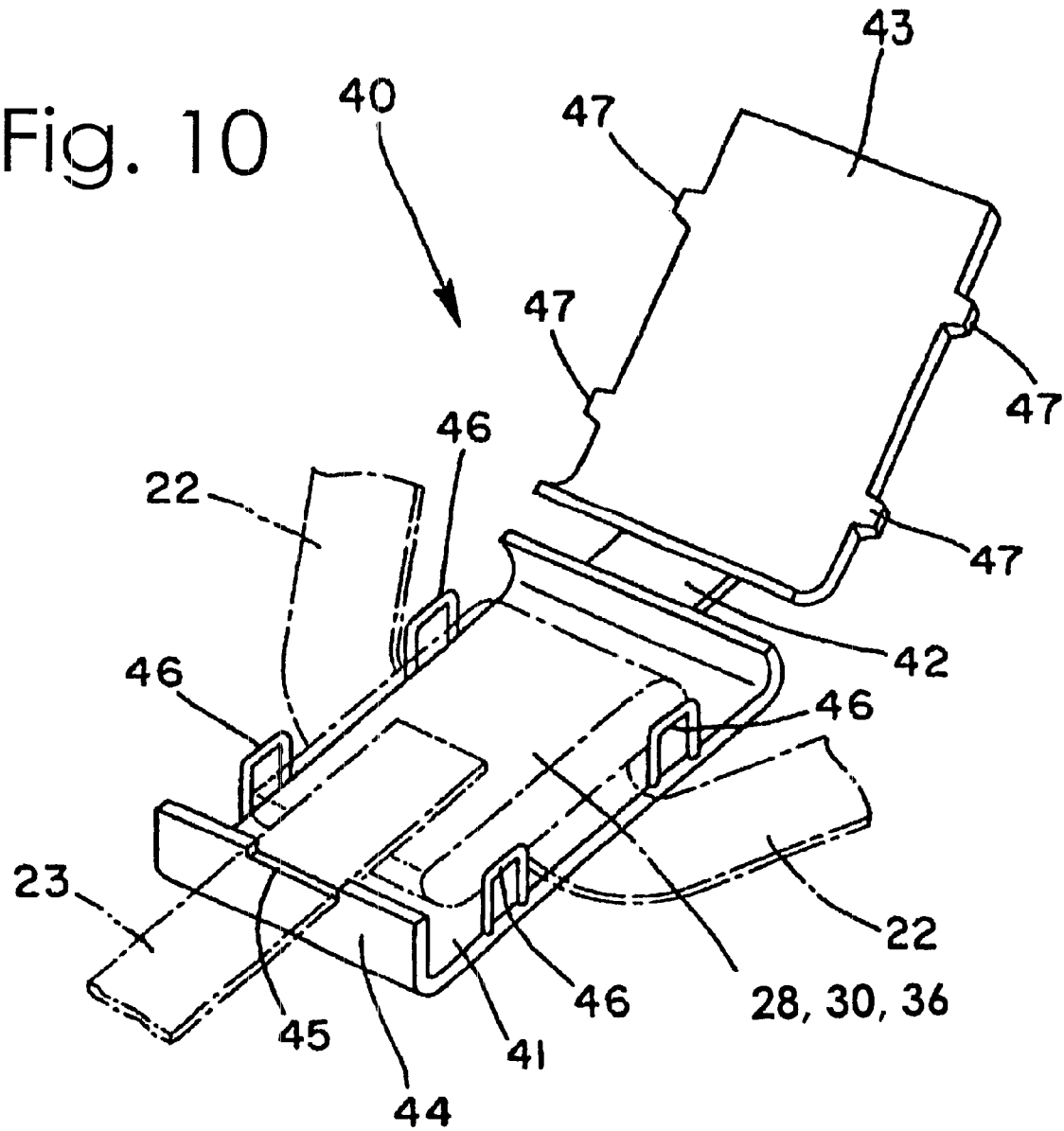
FIG. 10 is a perspective view of a housing in which the blocks shown in FIGS. 3–9 is accommodated.
Figure 11:
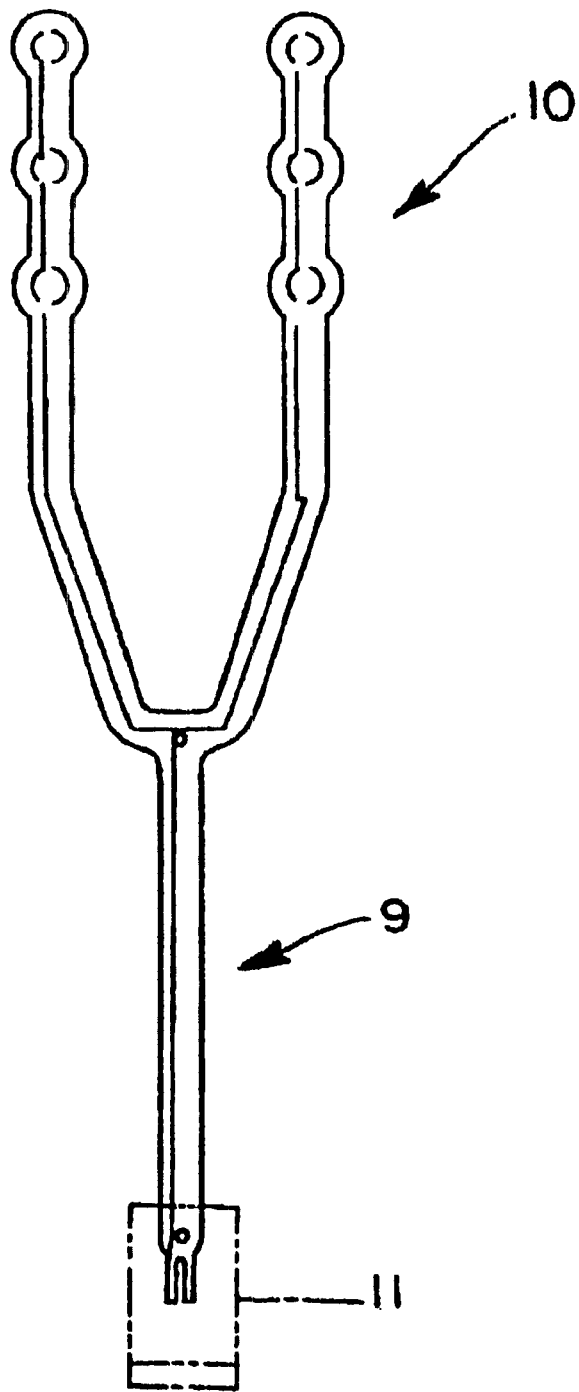
FIG. 11 is a plan view of a known seat occupant sensor device.

FIG. 10 illustrates a housing 40 which is capable of accommodating therein any one of the block members 28, 30, 36 described above. The housing 40 is formed of synthetic resin and includes a base portion 41, a lid portion 43, and a belt portion 42 extending from an end of the base portion 41 and connected to the lid portion 43. The base portion 41, lid portion 43, and belt portion 42 are integrally formed to constitute an integral housing 40.

The base portion 41 is provided at one of its end portions (its distal end portion) with an upstanding portion 44. The upstanding portion 44 is the same height as the thickness of the block member 28, 30, 36. The central portion of the upper periphery of the upstanding wall 44 is provided with a groove 45 through which the reversely extending connecting portion 23 passes. A pair of spaced apart inverted U-shaped hooks 46 is provided at each of the lateral sides of the base portion 41 (i.e., at the right and left sides of the base portion 41). Each sensor portion 22, 22 extends from inside the housing 40 to outside the housing 40 by passing through the space defined between the pair of spaced apart inverted U-shaped hooks 46 at one side of the housing 40. Each lateral side of the lid portion 43 is formed with a pair of spaced apart pawls 47, 47 that are each adapted to be brought into engagement with a respective one of the hooks 46, 46 in a releasable manner.

The block member 28 30, 36, which supports the sensor portions 22, 22 and the connecting portion 23, is placed on the base member 41 so that each of the sensor portions 22, 22 extends outside the housing 40 through the respective space between the hooks 46, 46 and so that the connecting portion 23 extends outside the housing 40 by way of the groove 45. The cover portion 43 is then closed relative to the base portion 41 so that each of the pawls 47 on the cover portion 43 is brought into engagement with a respective one of the hooks 47. The block member 28, 30, 36 is thus covered by the cover portion 43 so that the block member 28, 30, 36 is accommodated within the housing 40. Thus, the connecting region at which each of the sensor portions 22, 22 meets the connecting portion 23 becomes protected by the housing 40.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat occupant sensor device for detecting whether or not an occupant is seated on a seat, comprising:
    a pressure sensitive switch that includes a pair of sensor portions and a connecting portion, each of the sensor portions being formed as an integration of a pair of opposed films and a spacer, one of films being provided with a plurality of spaced first electrodes which are electrically connected to each other by way of a first conductive path, the other film being provided with a plurality of spaced second electrodes which are electrically connected to each other by way of a second conductive path, the spacer being disposed between the pair of opposed films in such a manner that each of the first electrodes is maintained separate from the second electrodes when the seat is unoccupied, the first conductive path and the second conductive path extending into the connecting portion, the connecting portion being positioned, when in its free state, between the pair of sensor portions;
    a connector provided at a distal end of the connecting portion for connecting the first conductive path and the second conductive path to an external control device; and
    a block member positioned at a connecting region of the pressure sensitive switch at which a proximate end of the connecting portion is connected to each of the sensor portions to guide the connecting portion in a reversely extending manner.

2. The seat occupant sensor device as set forth in claim 1, wherein the block member is in the form of a rectangular prism to which are adhered the connecting region and a portion of the reversely extending connecting portion.

3. The seat occupant sensor device as set forth in claim 1, wherein the block member includes a main body provided with a hole and a cover member provided with a pin portion, the pin portion being adapted to be positioned in the hole of the main body to hold the connecting region between the main body and the cover member with a distal end of the pin portion holding the reversely extending connecting portion.

4. The seat occupant sensor device as set forth in claim 1, wherein the block member is provided with a hole, the connecting region and the reversely extending connecting portion being held by a connection element.

5. The seat occupant sensor device as set forth in claim 4, wherein the connection element is a rivet.

6. The seat occupant sensor device as set forth in claim 1, further comprising a housing in which is accommodated the connecting region, the housing including a base portion and a lid portion which is in detachable engagement with the base portion, each of the sensor portions extending outside the housing from a lateral side of the housing, the connecting portion extending outside the housing from a distal end of the base portion.

7. The seat occupant sensor device as set forth in claim 2, further comprising a housing in which is accommodated the connecting region, the housing including a base portion and a lid portion which is in detachable engagement with the base portion, each of the sensor portions extending outside the housing from a lateral side of the housing, the connecting portion extending outside the housing from a distal end of the base portion.

8. The seat occupant sensor device as set forth in claim 3, further comprising a housing in which is accommodated the connecting region, the housing including a base portion and a lid portion which is in detachable engagement with the base portion, each of the sensor portions extending outside the housing from a lateral side of the housing, the connecting portion extending outside the housing from a distal end of the base portion.

9. The seat occupant sensor device as set forth in claim 4, further comprising a housing in which is accommodated the connecting region, the housing including a base portion and a lid portion which is in detachable engagement with the base portion, each of the sensor portions extending outside the housing from a lateral side of the housing, the connecting portion extending outside the housing from a distal end of the base portion.

10. A seat occupant sensor device for detecting whether or not an occupant is seated on a seat, comprising:
    a pressure sensitive switch comprised of a pair of films and a spacer positioned between the films, one of the films being provided with a first electrode connected to a first conductive path and the other film being provided with a second electrode connected to a second conductive path, the spacer being disposed between the pair of films in such a manner that the first electrode is separate from the second electrode when the seat is unoccupied, the pressure switch possessing a configuration defining spaced part sensor portions and a connecting portion, the first conductive path and the second conductive path extending into the connecting portion of the pressure sensitive switch, the sensor portions being connected to the connecting portion at a connecting region;
    a connector connected to the connecting portion for connecting the first conductive path and the second conductive path to an external control device; and
    a block member positioned at the connecting region of the pressure sensitive switch with at least a part of the connecting portion extending along the block member in a direction generally opposite the sensor portions.

11. The seat occupant sensor device as set forth in claim 10, wherein the block member is in the form of a rectangular prism to which are adhered the connecting region and a part of the connecting portion.

12. The seat occupant sensor device as set forth in claim 10, wherein the block member includes a main body provided with a hole and a cover member provided with a pin portion, the pin portion being positioned in the hole of the main body to hold the connecting region between the main body and the cover member with a distal end of the pin portion holding in place a part of the connecting portion.

13. The seat occupant sensor device as set forth in claim 10, wherein the block member is provided with a hole, the connecting region and the connecting portion being held by a connection element.

14. The seat occupant sensor device as set forth in claim 13, wherein the connection element is a rivet.

15. The seat occupant sensor device as set forth in claim 10, further comprising a housing in which is accommodated the connecting region, the housing including a base portion and a lid portion which is in detachable engagement with the base portion, each of the sensor portions extending outside the housing from a lateral side of the housing, the connecting portion extending outside the housing from a distal end of the base portion.

16. A seat occupant sensor device for detecting whether or not an occupant is seated on a seat, comprising:

a pressure sensitive switch comprised of a pair of sensor portions, a connecting portion and a connecting region at which the connecting portion is integrated with the sensor portions, each of the sensor portions being provided with at least one first electrode and at least one second electrode that are separated from one another when the seat is unoccupied and that contact one another when the seat is occupied, the first electrode of at least one sensor portion being connected to a first conductive path and the second electrode of at least one sensor portion being connected to a second conductive path, the first and second conductive paths extending into the connecting portion; and a connector connected to the first conductive path and the second conductive path for connecting the first and second conductive paths to an external control device;

the connecting portion being bent back upon the connecting region and extending in a direction generally opposite the direction of extent of the sensor portions.

17. The seat occupant sensor device as set forth in claim 16, including a block member positioned at the connecting region of the pressure sensitive switch, with at least a part of the connecting portion extending along the block member.

18. The seat occupant sensor device as set forth in claim 17, wherein the block member includes a main body provided with a hole and a cover member provided with a pin portion, the pin portion being positioned in the hole of the main body to hold the connecting region between the main body and the cover member with a distal end of the pin portion holding in place a part of the connecting portion.

19. The seat occupant sensor device as set forth in claim 17, wherein the block member is provided with a hole, the connecting region and the connecting portion being held by a rivet.

20. The seat occupant sensor device as set forth in claim 17, wherein the block member includes a guide wall positioned along each side of the block member that guides the connecting portion and inhibits the connecting portion from becoming laterally offset from the block member.

21. The seat occupant sensor device as set forth in claim 1, wherein the at least a part of the connecting portion extends along the block in a reversely extending manner so that a portion of the connecting portion extends in a direction generally opposite the direction of extent of the sensor portions.

22. The seat occupant sensor device as set forth in claim 1, wherein the connecting portion includes a bent back part at the connecting region, with the block member guiding the connecting portion so that the connecting portion extends in a direction generally opposite the direction of extent of the sensor portions, and the block member supporting the connecting portion at the bent back part.

23. The seat occupant sensor device as set forth in claim 10, wherein the connecting portion includes a bent back part at the connecting region, with the block member guiding the connecting portion so that the connecting portion extends in a direction generally opposite the direction of extent of the sensor portions, and the block member supporting the connecting portion at the bent back part.

24. The seat occupant sensor device as set forth in claim 16, wherein the connecting portion is bent back upon the connecting region at a bent back part of the connecting portion, the bent back part being supported on a block member.

* * * * *